(12) United States Patent
Bullock

(10) Patent No.: US 6,607,337 B1
(45) Date of Patent: Aug. 19, 2003

(54) CARGO RESTRAINT SYSTEM

(76) Inventor: Matthew Bullock, 4509 7$^{th}$ St., North Arlington, VA (US) 22203

( * ) Notice: Subject to any disclaimer, the term of this patent is extended or adjusted under 35 U.S.C. 154(b) by 0 days.

(21) Appl. No.: 09/979,028
(22) PCT Filed: May 5, 2000
(86) PCT No.: PCT/US00/12321
§ 371 (c)(1), (2), (4) Date: Nov. 15, 2001
(87) PCT Pub. No.: WO01/85490
PCT Pub. Date: Nov. 15, 2001

(51) Int. Cl.$^7$ .................................................. B60P 7/08
(52) U.S. Cl. .............................. 410/97; 410/34; 410/96
(58) Field of Search .............................. 410/32, 34, 36, 410/42, 96, 97, 100, 155; 220/1.5; 206/597, 410; 53/399, 441, 462, 556; 248/499

(56) References Cited

U.S. PATENT DOCUMENTS

| | | | | |
|---|---|---|---|---|
| 4,264,251 A | * | 4/1981 | Blatt ........................... | 410/100 |
| 4,964,771 A | * | 10/1990 | Callihan ....................... | 410/118 |
| 5,516,244 A | * | 5/1996 | Baka ............................. | 410/36 |
| 5,784,761 A | * | 7/1998 | Allen | |
| 6,089,802 A | * | 7/2000 | Bullock ......................... | 410/97 |
| 6,227,779 B1 | * | 5/2001 | Bullock ......................... | 410/98 |
| 6,368,036 B1 | * | 4/2002 | Vario ............................ | 410/98 |

\* cited by examiner

Primary Examiner—Stephen T. Gordon
(74) Attorney, Agent, or Firm—Bradford E. Kile, Esq.; Kile Goekjian Lerner & Reed

(57) ABSTRACT

A load restraint system for securing cargo within transport containers such as intermodal containers (10), railroad cars, truck trailers, and the like, including first and second load restraining strips (24) with an adhesive coating (30) on at least a portion of one surface of the strips for adherence to sidewalls of a container and a locking and load restraining strip for bonding the free ends of the first and second load restraining strips (24) together into a load restraining system wherein the width of the adhesive portion (30) of the load restraining system is less than the width of the wrap around section of the load restraint system.

12 Claims, 3 Drawing Sheets

CARGO RESTRAINT SYSTEM

BACKGROUND OF THE INVENTION

This invention relates to an improved system for reliably and effectively restraining cargo during transportation. More particularly, this invention relates to a novel system for securing and restraining undesired movement of boxes, drums, and the like within the interior of an intermodal container in ship cargo holds, placed on flatbed truck trailers, on railroad flatcars, or within the interior of truck trailers, railroad cars and the like.

Most shipments for export, both in the United States and abroad, are placed into either twenty or forty foot long, rectangular, intermodal containers. These containers are fabricated with steel, corrugated sidewalls and are structurally self-supporting and rugged. Several intermodal containers may be stacked on top of each other for transport by sea, rail, or road. Within the containers, drums or boxes hold actual product. Each of these forces has the potential to impart a substantial force on an intermodal container.

When traveling by rail, flatbed rail cars transporting intermodal containers may be made up through a process called humping. In this process, a flatbed rail car is pushed over an elevated section of tracks and then allowed to roll into a switching yard, where the cars are switched to make up train segments. When a car is rolled into a stationary string of cars, the impact causes the couplings to lock together. This impact, however, can also apply a jolt to the cargo of the magnitude of several times the force of gravity. Moreover, during transport, cars are subject to sudden braking forces, run-in and run-out impact over grades, rail vibration, dips in the track, and swaying. When intermodal containers are transported by sea, the cargo therein is subjected to rolling storm forces including: yaw, pitch, heave, sway, and surge. On the highway, intermodal containers and the cargo therein experiences acceleration and centrifugal loads, sudden braking, and vibration.

During transportation, an intermodal container and its cargo are two separate entities for the purposes of motion. The container may be mounted in a ship's cargo hold, on a flatbed railcar, on a flatbed truck trailer, or the like. The cargo, however, unless secured to the container is free to move within the interior of the intermodal container.

When the container changes direction or speed, the cargo tends to continue along the previously existing path until it contacts an interior wall of the container. Without some type of restraint and/or cushioning system, the cargo builds up considerable momentum, independent of the container. The amount of momentum is equal to the object's mass multiplied by its velocity. In the case of large cargo loads, even the slightest change in direction, or velocity, can generate substantial momentum. When cargo contacts the interior walls or doors of the container, the force necessary to reduce this momentum to zero is absorbed by the goods. Such forces may result in damage to the cargo, damage to the interior walls or doors of the container, damage to the cargo packaging, and may create dangerous leaks if the cargo is a hazardous material. Accordingly, it is undesirable to permit cargo to gain any momentum independent of the container. This is accomplished by restraining the cargo within the container so that the cargo and the container are essentially united during transport and operationally functioning as one object.

In the past, lading has been secured in the container to eliminate unwanted movement or shifting during transport. The drums, boxes, or other containers have been restrained in several different ways. Primarily, cargo was stabilized by a method of load-locking and lumber bracing. This system involves strategically placing lumber between a loadface and the rear doors of a container. This, however, can be a costly, time consuming, and generally inefficient means of securing a load. In this, the blocking process requires carpenters and is often outsourced to contractors. Accordingly, wood barriers can be time consuming to install and not very cost effective. Still further, wood bracing can be somewhat brittle and subject to failure under an abrupt impact. Moreover, conventional methods of load-locking and lumber bracing simply could not perform some tasks. For example, the most efficient means of filling an intermodal container is eighty fifty-five gallon drums double stacked in a twenty-foot long container. If this is done, however, there are only approximately one to two inches between the loadface and the rear doors. One to two inches is not enough space to put sufficient lumber to brace a load of eighty drums adequately. Consequently, when wood bracing was utilized as a system of restraint, shippers were forced to ship containers that were not filled to capacity, thereby reducing transport efficiency and increasing transportation costs.

Similarly, the Bureau of Explosives has established a standard of review to determine if a particular restraint system is capable of adequately securing hazardous cargo. In certain instances, conventional load-locking and lumber bracing was not able to receive approval to ship hazardous cargo by the Bureau.

Other known means of restraint employed ropes, straps, or stands. Methods appearing in the past have tended to exhibit impaired performance and are often not functionally suitable to restrain loads under even moderate conditions. Consequently, a need exists for securing lading in intermodal containers that is functionally effective, cost-affective, labor-efficient, and able to comply with Department of Transportation and Bureau of Explosives regulations.

At least one method and apparatus for restraining cargo movement which overcomes some of the foregoing limitations is disclosed in U.S. Pat. No. 4,264,251, of common assignment with the subject application. The invention disclosed in that patent comprises sealing strips that are adhered to opposing sidewalls of a container, a strip of bracing material, and an adjoining mechanism used to bind the ends of the strips together into a secure and taut restraint. The disclosure of this patent is hereby incorporated by reference as though set forth at length. Thus, the concept of a strip of material being used as a barrier to restrain cargo or lading is disclosed in the '251 patent.

In the '251 patent, material strips were applied in a manner similar to hanging wallpaper, wherein a separate adhesive was applied to the surface where adhesion was desired. Then the retaining strip was applied. In addition to this requirement of a separate adhesive, the systems in the past had problems with weakness at the joints. At the juncture where the strips came together, an opportunity existed for slippage of the joined panels. Moreover, intermodal containers have corrugated walls. These corrugations make applying a restraining strip to a separate adhesive, which may not have an even application, substantially more difficult.

Restraining systems in the past required multiple elements, were difficult to store, were arduous to install, and often required a degree of skilled labor. Systems using straps, nails, anchors, or bolts all require substantial storage space even when not in use. Furthermore, such systems increase the safety risk to the workers restraining the cargo.

Still further, products and procedures used in the past relying on accessories located in the cargo container often were not able to secure a partial load. That is, if the load does not extend to the far rear of the container, the necessary anchors may not be available in an area where they can be used.

The problems suggested in the foregoing are not intended to be exhaustive but rather are among many which may tend to reduce the effectiveness of cargo restraining systems. Other noteworthy problems may also exist; however, those presented above should be sufficient to demonstrate that cargo-restraining systems appearing in the prior art have not been altogether satisfactory.

OBJECTS AND SUMMARY OF THE INVENTION

Objects

It is a general object of the subject invention to secure a load within a transport container such as a truck trailer, boxcar, intermodal container, or the like which will obviate or minimize problems of the type previously discussed.

It is another object of the subject invention to reduce the material and labor costs involved in securing a load within an intermodal container.

It is still another object of the subject invention to protect cargo from damage during transport.

It is yet another object of the subject invention to provide a system capable of restraining eighty, fifty-five gallon drums, double stacked, in a twenty-foot intermodal container capable of receiving Department of Transportation and Bureau of Explosives approval.

It is a particular object of the subject invention to provide a system for securing cargo that is entirely self-contained and may be installed quickly, reliably, and efficiently by unskilled labor, even in intermodal containers having corrugated walls.

It is another object of the subject invention to provide for efficient and simple removal of the securing system at a cargo destination.

It is a further object of the subject invention to provide enhanced electricity of a restraint system and decrease the amount of adhesive that is needed in providing a reliable attachment to a container sidewall.

It is still a further object of the subject invention to provide a system for restraining cargo that is able to withstand a wide range of temperatures and levels of humidity to enable use in all climates.

BRIEF SUMMARY OF THE INVENTION

One preferred embodiment of the invention that is intended to accomplish at least some of the foregoing objects comprises a flexible, substrate or strip material that is resistant to axial lengthening when placed in tension under the weight of a cargo load. One side of the strip is at least partially coated with a self-adherent adhesive. A release paper is applied over the adhesive and the strip is suitable to be wound on a core. The adhesive coated end is suitable to be adhered to the side wall of a container and the other end of the strip extends laterally around cargo within the container, and is joined to an opposing strip mounted on the opposite side wall of the container to secure a cargo load. The strip increases in width from the first adhesive side wall engaging section to the second load embracing section.

In use, a length of release paper is peeled away from an adhesive portion of the retaining strip. Next, the adhesive face is self-adhered to an interior side of an intermodal container, transport container, tractor-trailer, boxcar, or the like. The adhesive portion of a second strip is applied to the opposite side of the container and a wider portion of the two strips are wrapped around goods to be contained. The ends of opposing strips, which extend around the rear of the container, are overlapped at a center location. A tensioning tool is used to wind the two lapped ends to draw the opposing strips taut. A release paper is then removed from the overlapped or joint region of the strips. A third, shorter piece of the strip material is then adhered to the exposed adhesive of the opposing strips at the joint. The third shorter strip thus locks the side strips in place with an adhesive-to-adhesive seal and forms a secure load restraining system.

THE DRAWINGS

Other objects and advantages of the present invention will become apparent from the following detailed description of a preferred embodiment taken in conjunction with the accompanying designs wherein.

Figure 5:
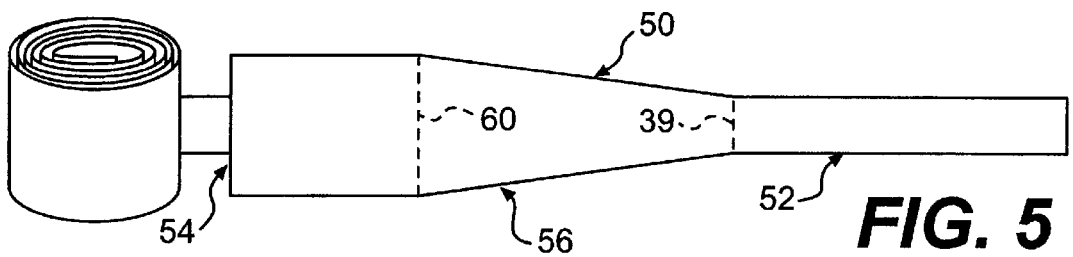
Figure 6:
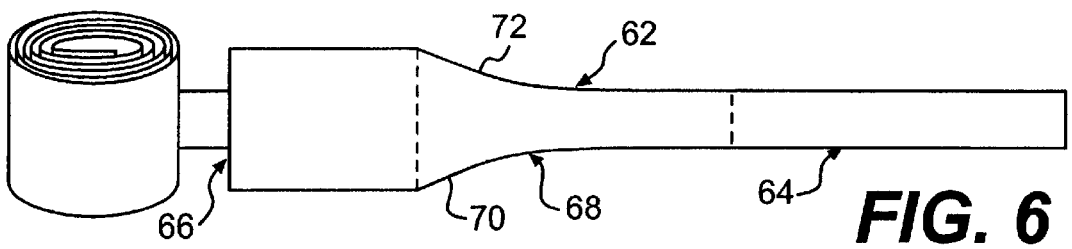
Figure 7:
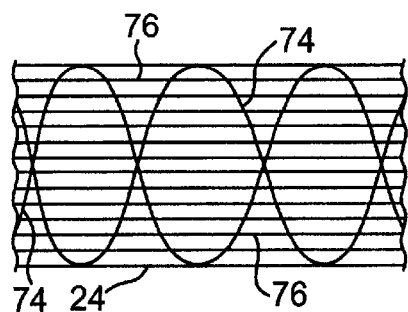
Figure 8:
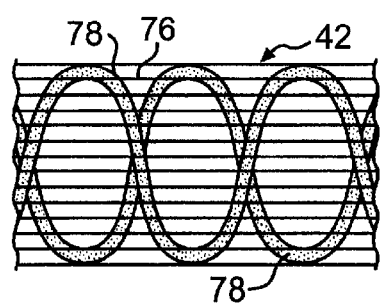
Figure 9:
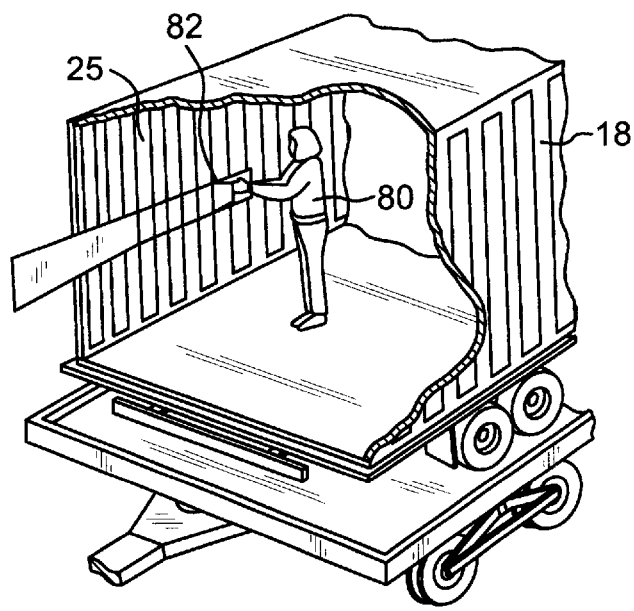
Figure 10:
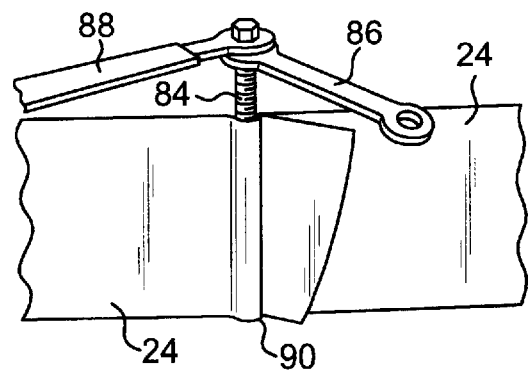
Figure 11:
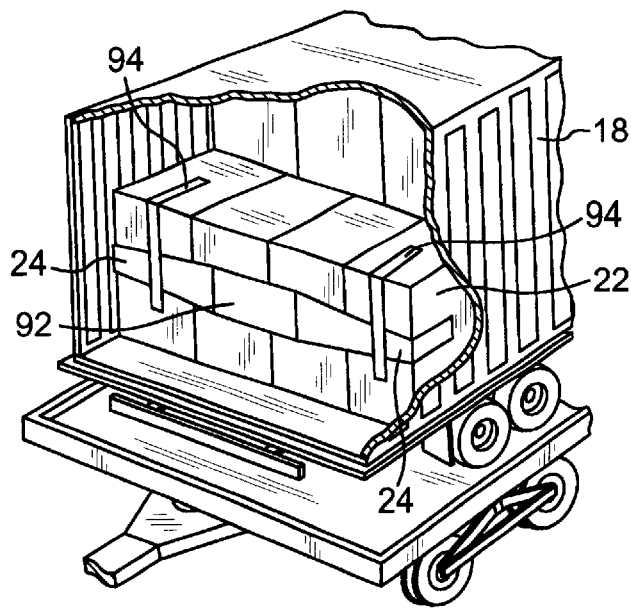

FIG. 5 is a plan view of another alternative embodiment of a restraining strip wherein the strip is generally rectangular at one end and comprises relatively narrow side wall adhesive section, a wrap around section having a lateral dimension at one end greater than the lateral dimension at the other end, and a generally rectangular, overlap and locking adhesive section at the other end of the strip that has a width greater than the adhesive section;

FIG. 6 is a plan view of another embodiment of a restraining strip as depicted in FIG. 5 wherein the edges of the wrap around section are accurate and concave facing outwardly;

FIG. 7 is a side view of a broken away portion of a restraining strip disclosing laminated reinforcement threads to strengthen the strip against elongation during use;

FIG. 8 is a side view of a broken away portion of a restraining strip similar to FIG. 7, wherein reinforcement fiber brands are embedded within the restraining strip for added strength of the strip;

FIG. 9 depicts the first step in a method of use of the present invention wherein the release paper is removed to expose the adhesive and the strip is applied to a corrugated, interior wall surface of an intermodal container;

FIG. 10 depicts the use of a tensioning tool to draw up opposing ends of overlapped strips around cargo to be restrained; and FIG. 11 is the last step in the use of the present invention wherein a short generally rectangular segment of a restraining strip is cut, the release paper is removed exposing the adhesive and the strip is used to secure the barrier strips with a secure adhesive-to-adhesive junction across the joint.

DETAILED DESCRIPTION

Context of the Invention

Figure 1:
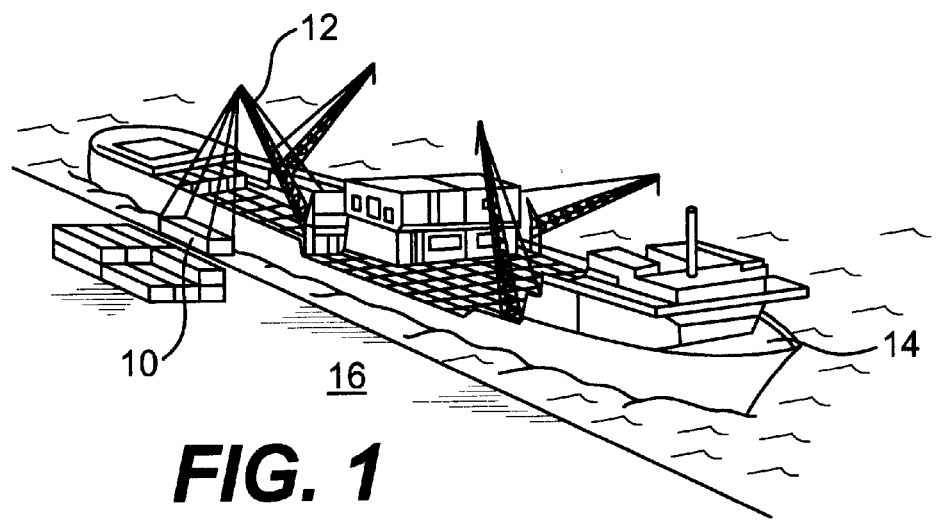
FIG. 1 is an aerial view of a ship at a dock, lifting and loading an intermodal container with a crane to be placed on decks or in the ship's cargo hold.

Referring now particularly to FIG. 1, there is shown one operative context of the subject invention, where intermodal containers 10 are being loaded onto a ship 14. The invention may be used to secure cargo within an intermodal containers 10, and transport containers. Specifically, FIG. 1 depicts a series of intermodal containers 10 sitting on a dock 16 and being lifted with a crane 12 to be placed in the ship's cargo hold or on the deck of the ship.

Figure 2:
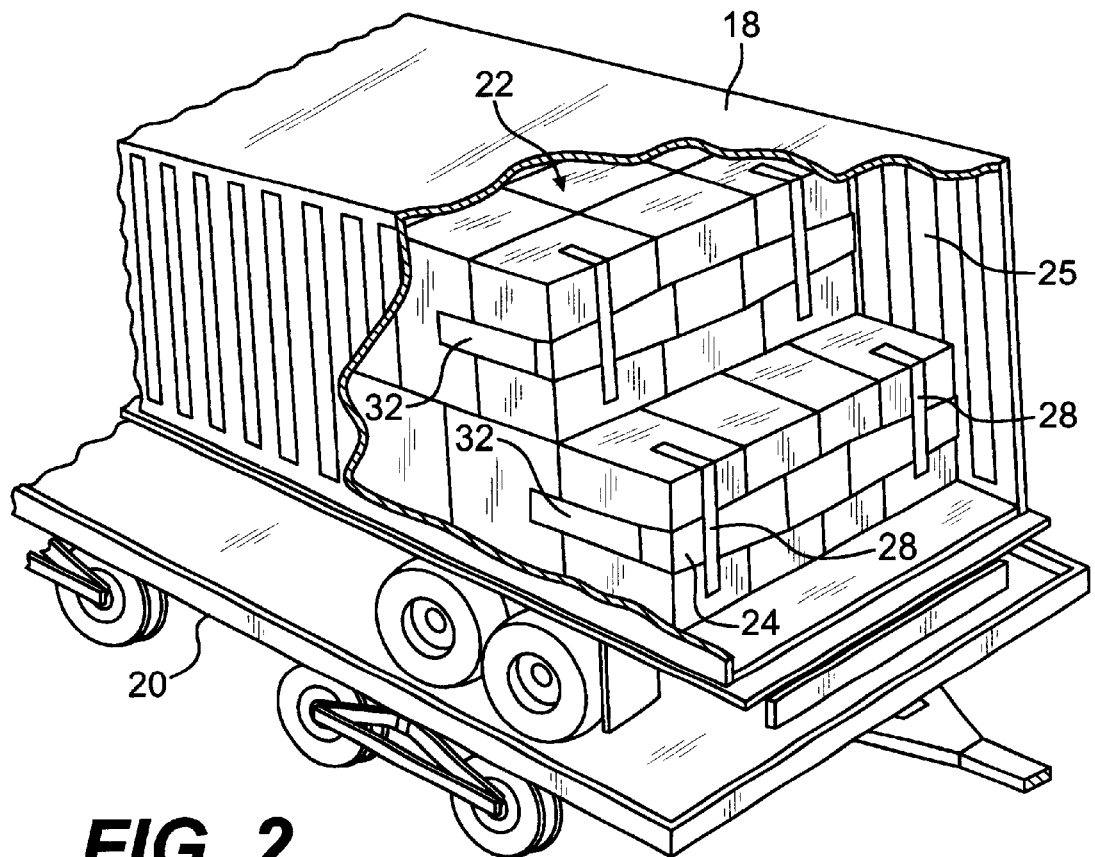
FIG. 2 is an axonometric view, partially broken away, showing the interior of an intermodal container secured to a flatbed of a truck-trailer and then positioned upon the bed of a railroad flat car for transport overland.

FIG. 2 is an axonometric view that discloses the invention in another illustrative operating environment. A twenty-foot long intermodal container 18 is mounted upon a flatbed truck-trailer. The truck-trailer in turn is mounted upon a railroad flat car 20 for land transport. Rail line city-to-city transport is provided for long hauls and point-to-point truck hauling is used to driver cargo to a specific site.

FIG. 2, also depicts a partially cut-away view to disclose a cargo restraining strip 24, comprising an embodiment of the subject invention, operably adhered to an interior wall surface 25 of the cargo container 18. A restraining strip 24 is attached to the interior wall surface 25 of the cargo container 18 and then extend around the rear of a load 22. In a similar manner, an opposing strip 24 is attached to the opposite wall of the container and extends around the rear of the load 22 and is joined with the first strip.

The cargo restraining strips 24 may be taped, as at 28, to the load 22 in order to avoid sagging of the strips in the event that the load is compressed due to a front-end impact. FIG. 2 depicts the subject invention in a completed operative state suitable for facilitating transport without shifting damage to the cargo 22.

Restraining Strip

Figure 3:
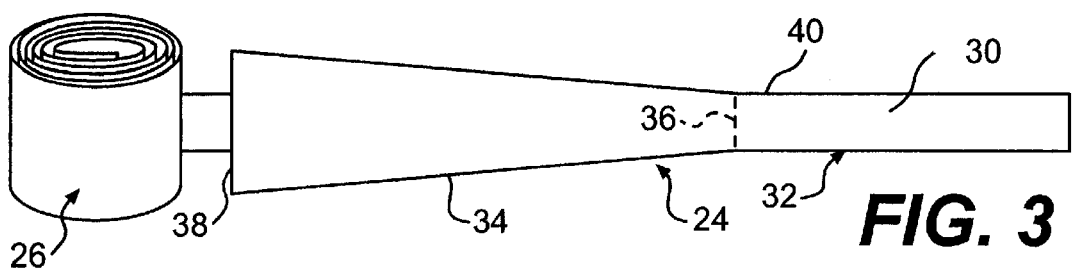
FIG. 3 (note sheet two) is a pictorial view of the present invention showing a restraining strip, a sidewall adhesive section and restraining strip wherein the width of the adhesive section is less than the width of a wrap around section.

Turning to FIG. 3, the restraining strip 24 is disclosed in accordance with a preferred embodiment of the invention. More particularly, a roll 26 of repeating polyester strips 24 comprising the subject invention 24 is depicted. Preferably, the polyester strip 24 is approximately ten inches in width at one end and fifteen inches in width at the other. However, other widths may be substituted depending on the need for additional or less strength. The polyester strip 24 is preferably a spun bonded olefin but may also be comprised of acrylic, a resin differential polymer, or VALERON®. Companies such as DuPont, Hoeschst Celanese, and other manufacture such materials. The strip 24 may be monolithic or inlaid with polyester or polyethylene fiber reinforcement strands in a manner which will be discussed below.

In a preferred embodiment, as shown in FIG. 3, the roll 26 is composed of a series of repeating cargo load restraining strips 24. Each load restraining strip has a first end 32, which is generally rectangular in shape with a width of approximately ten inches and a length of five feet. Axially joined at one end of the rectangular segment 32 is a generally truncated cone segment 34. The top 36 of the truncated cone segment is integrally joined with one end of the rectangular segment 32. In a preferred embodiment, the top of the truncated cone is ten inches and the base 38 is sixteen inches. The length of the truncated cone is approximately seven feet so that the overall length of each restraining strip 24 is approximately twelve feet.

An adhesive coating is coextensively applied to a first side of at least the generally rectangular end 32 of the restraining strip 24 and is operable to adhesively bind the restraining strip 24 to a side wall surface 25 of a container 18, note again FIG. 2. The adhesive is preferably composed of acrylic but may also be resin or polymers. The adhesive is an acrylic adhesive that exhibits the characteristics of high tack, high peel, and high shear strength. The adhesive 30 bonds well to glass, metals, paper, and films. Additionally, it has excellent cold temperature resistance and had a built-in ultraviolet stabilizer.

A release paper 40 is applied over the adhesive coating on the first side of the strip segment 32 and is cut with a perforation column along the tip 36 of the truncated cone 34 as shown in FIG. 3. Alternatively, separate, non-perforated, panels of release paper may be used, butted up against one another end-to-end, or overlapped slightly at one end. Alternatively, divisions of the release paper and adhesive may be used at periodic intervals.

Figure 4:
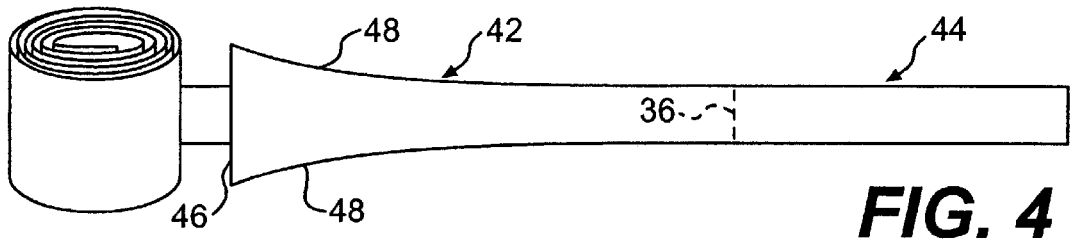
FIG. 4 is a plan view of an alternative embodiment of a restraining strip from a roll of strips depicted in FIG. 3, wherein the edges of the wrap around section of the strip are accurate and concave outwardly.

An alternate embodiment of the present invention is disclosed in FIG. 4 and comprises cargo restraining strip 42 similar to cargo restraining strip 24. In this embodiment, the strip 42 has a first, generally rectangular, segment 44 which is similar in all respects to segment 32 in FIG. 3. The cargo restraining strip 42 is different from strip 24 in that a generally truncated cone section 46 has side edges 48 which are arcuate and are concave and open outwardly as shown in FIG. 4. In a preferred form of this embodiment, the segment 44 is ten inches wide and five feet in length. The generally truncated cone segment with arcuate side walls has a top dimension of ten inches and a base dimension of sixteen inches.

FIG. 5 depicts yet another embodiment of the invention where a cargo restraining strip 50 is composed of three segments. A first end segment is a generally rectangular member 52 which is coated with an adhesive and release paper and operably provides engagement of the strip 50 with the sidewall of a transport container. This segment, as noted above, is ten inches in width and five feet long. A second end segment 54 is also generally rectangular and is sixteen inches in width and approximately two feet in length. This rectangular segment 54 is also coated with an adhesive and release paper. An intermediate, wrap around truncated cone segment 56 extends between the first end segment 52 and the second end segment 54. The width of the top 39 of the truncated cone is ten inches and is integral with one end of the segment 52 and the width of the bottom 60 is 16 inches and is integral with one end of the second end rectangular segment 54. The length of the first segment 52 is five feet, the intermediate wrap around segment is five feet and the second end segment 54 is two feet in length. An adhesive and release paper is applied to at least the first 52 and 54 rectangular segments as discussed above. In the event an adhesive material were applied to any or all of the truncated cone segment release paper would be applied to that section as well.

In still another embodiment of the subject invention a cargo restraining strip 62 is shown in FIG. 6. This strip is substantially identical with the cargo restraining strip 50 depicted in FIG. 5. The strip 62 is composed of three segments 64, 66 and 68 corresponding to segment 52, 54 and 56. The difference is cargo restraining strip 62 is that side edges 70 and 72 of the generally truncated cone shaped wrap around segment 68 has a concave shape looking outwardly.

This enables the elasticity of the strip to be tailored to the needs of specific uses.

Although the cargo restraining strips 24, 42, 50 and 62 depicted in FIGS. 3–6 are preferably composed of sheets of a spun bonded olefin in certain instances where added strength and durability is desired.

A sinusoidal crossing pattern of reinforcement strands 74 may be used in conjunction with a longitudinal, parallel pattern of strands 76 to provide added strength to the restraining strip both longitudinally and laterally as shown in FIG. 7. Alternately, a longitudinal crossing pattern of reinforcing straps 78 may be used alone or in conjunction with strands 76 to provide enhanced stability.

The polyester reinforcing fibers that comprise the strip may be assembled or woven in various patterns. The fibers may be arranged longitudinally, laterally, diagonally, sinusoidally, or in any combination of the patterns. Moreover, these reinforcing fibers may be comprised of single strands or bundles of many strands, or any combination thereof.

In all of the embodiments discussed above, the selective placement of the adhesive allows a roll 26 of restraining strip 24, 42, 56 or 62 to be customized to the needs of a particular customer. As a result, the adhesive and release paper would only be placed where it is necessary to be used and not in the areas where the customer does not anticipate needing an adhesive component applied to the restraining strip. Selective application of adhesive allows a lower cost to the consumer and a higher level of economy for an overall system. For example, an intermodal container that this product is designed to be used in is either twenty or forty feet in length, ninety-two inches (seven feet, eight inches) wide, and ninety-two inches high. If a customer is exclusively using an intermodal container having these dimensions, adhesive would only be applied on the sidewall section 32 and any central overlapping portion at the base end of the truncated cones or the rectangular segments 54 and 66. Thus, if the restraining strip is manufactured such that there is five feet of adhesive and then five feet without adhesive, and two feet of adhesive and repeated, the costs of adhesive could be reduced and little if any adhesive would be left unused.

Method of Restraining Cargo Using a Polyester Restraining Strip

Attention is now invited to FIGS. 9–11 where a sequential method is disclosed for using the restraining strip 24 to secure a load in accordance with a preferred embodiment of this invention.

FIG. 9 discloses the first of four general steps. To begin, a user 80 cuts two polyester restraining strips 24 from a roll 26 for each load barrier required. The lengths of the strips 24 are cut to twelve feet and a third adhesive strip is cut from another roll in a length of four to five feet. A glueline should start two (2) feet back from the door of the containers and extend at least five (5) feet towards the nose of the container from the loadface in order to ensure only a sheer pull on an adhered portion of the strip in the event of any unintended force acting on the cargo.

A user 80 peels the release paper 40 from the polyester restraint strip 24 to expose a length of adhesive strip 32. The adhesive side of the strip 24 is then applied to a corrugated, interior wall surface 25 of the container substantially parallel to the container floor. Although not all walls of every container are corrugated, if the walls of the container are corrugated, it is important for the user to follow the contours of the corrugations. This method of application allows for superior gripping of the adhesive to the side wall surfaces of the container.

As the adhesive is pressure sensitive, a bonding roller 82 is used to firmly secure the strip to the interior wall 25 of the container 18. This process of positioning a strip 24 and adhesion is repeated on the opposing side of the container. The two strips 24 then project beyond the rear of the container 18 and the container is loaded with cargo. The strips 24 are then wrapped around the load far enough so that they overlap. The polyester restraining strips 24 are wrapped around the end of the load and a release paper 40 faces outward away from the cargo or lading.

FIG. 10 depicts a step in the process to use the present invention wherein the overlapping strips 24 are made taut and then the release paper 40 is removed exposing adhesive at the junction location. In this, a user 80 inserts a tension tool (clothespin) 84 into the overlapping portion. Then the user 80 places a small wrench 86 over an end of the clothespin and a long handled wrench 88 on top (with the handle flush against the load). The user 80 then tensions the overlapping strips 24 with the wrench 86 and 88.

The use of the tensioning tools is shown with greater detail in U.S. Pat. No. 4,264,251, previously incorporated by reference and thus will not be repeated at length here except to note that the process briefly described creates a vertical joint 90 between the ends of the two strips 24.

Once the two retaining strips 24 are drawn taut, four or five foot strip of adhesive is exposed at the base of the strips by the removal of the release paper. In FIG. 11, a user removes release paper from a third strip of material 92 preferably in a four or five foot length, and places it across the joint 90 formed by the two overlapping strips 24. In this location, the adhesive at the ends of the strips 24 has already been exposed, as noted above. The third piece 92 of the restraining material is rolled to assure a secure adhesive-to-adhesive bond between the three strips. It is the adhesive-to-adhesive bond formed at this stage that creates added safety and security of the present invention.

A final, optional, step of the process is also depicted in FIG. 11. In this optional step, tape 94 is used to secure the barrier strips 24 formed by the polyester strips to the cargo or lading in order to prevent sagging in the event of compression due to a front-end impact.

Having described in detail a preferred embodiment of the invention, it may be useful to briefly set forth some of the major advantages of the invention.

SUMMARY OF MAJOR ADVANTAGES OF THE INVENTION

This subject invention provides a shaped polyester strip, wherein necessary adhesive is already apparent on the polyester strip and can be brought to use by merely peeling a release paper, so that the release paper may be torn off and the adhesive exposed, thereby requiring no additional adhesive for the interior of a container in order to restrain the cargo to be transported.

This invention also provides an entirely self-contained load restraint system because having the adhesive already present on the strip eliminates the need for additional loading space for materials. The side elements of the restraining strip are generally truncated cone ends which reduces the amount of adhesive needed while providing a relative wide cargo embracing component. The elasticity of the restraining system can be advantageously design by using straight of arcuate side edges of the strip and with or without reinforcing fibers embedded within the strip.

This invention enables a one single product to safely secure an entire load or even only a partial load and moreover, to accomplish this without having to brace, nail, anchor, strap, or bolt, thereby substantially reducing labor costs and installation time.

This invention still further provides a product for restraining a load having enhanced sheer strength and minimum peel resistance so that, upon arrival at the destination, it may be quickly removed and disposed.

This invention yet further provides for superior gripping and restraining due to the adhesion following the undulations of the corrugated, interior walls of the intermodal container.

This invention also provides an adhesive-to-adhesive bond, at the rear of the load. Once the load is packed and the strips are overlapped, the release paper covering the adhesive is removed and a third strip is adhered to the joint where the two lapped strips are already present. This provides for a safe and secure joint.

In describing a restraining system and process for use in securing cargo while in transport in accordance with a preferred embodiment of the invention those skilled in the art will recognize several advantages which singularly distinguish the subject invention from the heretofore known prior art.

A particular advantage of the subject invention is the capability to secure full or partial loads with only one product.

Another significant advantage of the subject invention is ability to customize the roll of polyester self-adhesive material to the needs of a particular customer.

Yet another significant advantage of the subject advantage is the strength of the barrier formed by the adhesive-to-adhesive bond formed at the rear of the load.

A further significant advantage of the subject invention is the ability to withstand the substantial force generated by restraining eighty fifty-five gallon drums, double stacked, in a twenty foot long container.

While the foregoing discussion has been made with reference primarily to intermodal containers the subject invention also has application in other carrying containers where it is important to secure a load such as in truck trailer, railway cars and the like.

In describing the invention, reference has been made to a preferred embodiment. Those skilled in the art, however, and familiar with the disclosure of the subject invention, may recognize additions, deletions, substitutions, modifications and/or other changes which will fall within the purview of the invention as defined in the following claims.

What is claimed is:

1. A load restraining system for securing cargo within a transport container during transport, which cargo is subject to shifting forces, said load restraining system comprising:

a first load restraining strip having a first side and a second side, said strip being pliant and flexible while concomitantly resistant to axial lengthening under tension loading, said strip being operable to engage, at one end, an interior wall surface of the transport container and to extend at the other end at least partially across a face of cargo to be restrained within the container to secure the cargo, in situ, and prevent in transit shifting of the cargo against itself or against a wall or door surface of the transport container;

said first side of said strip being coated, at least at said one end with an adhesive for adhering said one end of said strip to the interior wall surface of the transport container;

a release paper extending coextensively with and releasably adhering to said adhesive applied to said first side, at least at said one end, of said first load restraining strip;

said one end of said first load restraining strip having a width dimension that is less than the width dimension of said other end of said first load restraining strip;

a second load restraining strip having a first side and a second side said second strip being pliant and flexible while concomitantly resistant to axial lengthening under tension loading, said second strip being operable to engage, at one end, an interior wall surface of the transport container and to extend at the other end at least partially across a face of cargo to be restrained within the container to secure the cargo, in situ, and prevent in transit shifting of the cargo against itself or against a wall or door surface of the transport container;

said first side of said second strip being coated, at least at said second strip one end with an adhesive for adhering said one end of said second strip to an interior wall surface of the transport container;

a release paper extending coextensively with and releasably adhering to said second strip adhesive applied to said first side, at least at said one end, of said second load restraining strip;

said one end of said second load restraining strip having a width dimension that is less than the width dimension of said other end of said second load restraining strip; and the other, wider, end of said first load restraining strip extending at least partially across the load and the other, wider, end of said second load restraining strip extending at least partially across the load and being secured and joining with said other end of first load restraining strip at a junction location to restrain cargo within the transport container.

2. A load restraint system for securing cargo within a transport container as defined in claim 1 further comprising:

adhesive applied to at least a portion of the other, wider, end of said first side of said first load restraining strip and the other, wider, end of said first side of said second load restraining strip; and a locking load restraining strip having a first side and a second side, said locking load restraining strip having an adhesive extending coextensively with said first side of said locking load restraining strip and the adhesive of said locking load restraining strip being abutted against and adhered to the other, wider, ends of said first and said second load restraining strips to lock said first and said second load restraining strips into an adhesive bond, thereby forming a secure load restraining system.

3. A load restraint system for securing cargo within a transport container as defined in claim 2, wherein:

said first load restraining strip is approximately ten inches in a width dimension at said one end and approximately fifteen inches in a width dimension at said other end thereof; and said second load restraining strip is approximately ten inches in a width dimension at said one end and approximately fifteen inches in a width dimension at said other end thereof.

4. A load restraint system for securing cargo within a transport container as defined in claim 1, wherein:

said first and second load restraining strips comprising a polyester substrate and a reinforcing network of fibers.

5. A load restraint system for securing cargo within a transport container as defined in claim 2, wherein:
   said adhesive composes an acrylic adhesive having the characteristics of self-adherence to a steel wall surface of a transport container, and a high shear strength.

6. A load restraint system for securing cargo within a transport container as defined in claim 1, wherein:
   said first and second load restraining strips comprise a spun bonded polyester substrate and a reinforcing materials of fibers.

7. The load restraint system for securing cargo within a transport container as defined in claim 2, wherein:
   said first and second loading restraining strips comprise a substrate and a plurality of reinforcement strands bound to said substrate in a parallel array.

8. A load restraining system for securing cargo within a transport container as defined in claim 7, and further comprising:
   a plurality of fiber reinforcement strands bound to said substrate along said first and second loading restraining strips with a sinusoidal crossing pattern to provide enhanced stability of said restraining system during transport.

9. A load restraining system for securing cargo within a transport container as defined in claim 1, wherein:
   said one end of each of said first and second load restraining strips comprise a generally rectangular component operable to be adhered to a side wall of the transport container; and
   said first and second load restraining strips each comprises a wrap around component that is generally shaped as a truncated cone with a top edge of the truncated cone integrally extending from one end of said generally rectangular component.

10. A load restraint system for securing cargo within a transport container as defined in claim 9 wherein:
    edges of said generally truncated cone are arcuate and concave facing outwardly.

11. A load restraining system for securing cargo within a transport container as defined in claim 9 and further comprising:
    a generally rectangular section integrally joined at a respective base of each of said generally truncated cones and being operable to overlap with opposing portions of said first load restraining strip and said second load restraining strip to be secured and joined at a junction location to restrain cargo within the transport container.

12. A load restraint system for securing cargo within a transport container as defined in claim 11 wherein:
    side walls of said generally truncated cone are arcuate and concave facing outwardly.

* * * * *